UNITED STATES PATENT OFFICE.

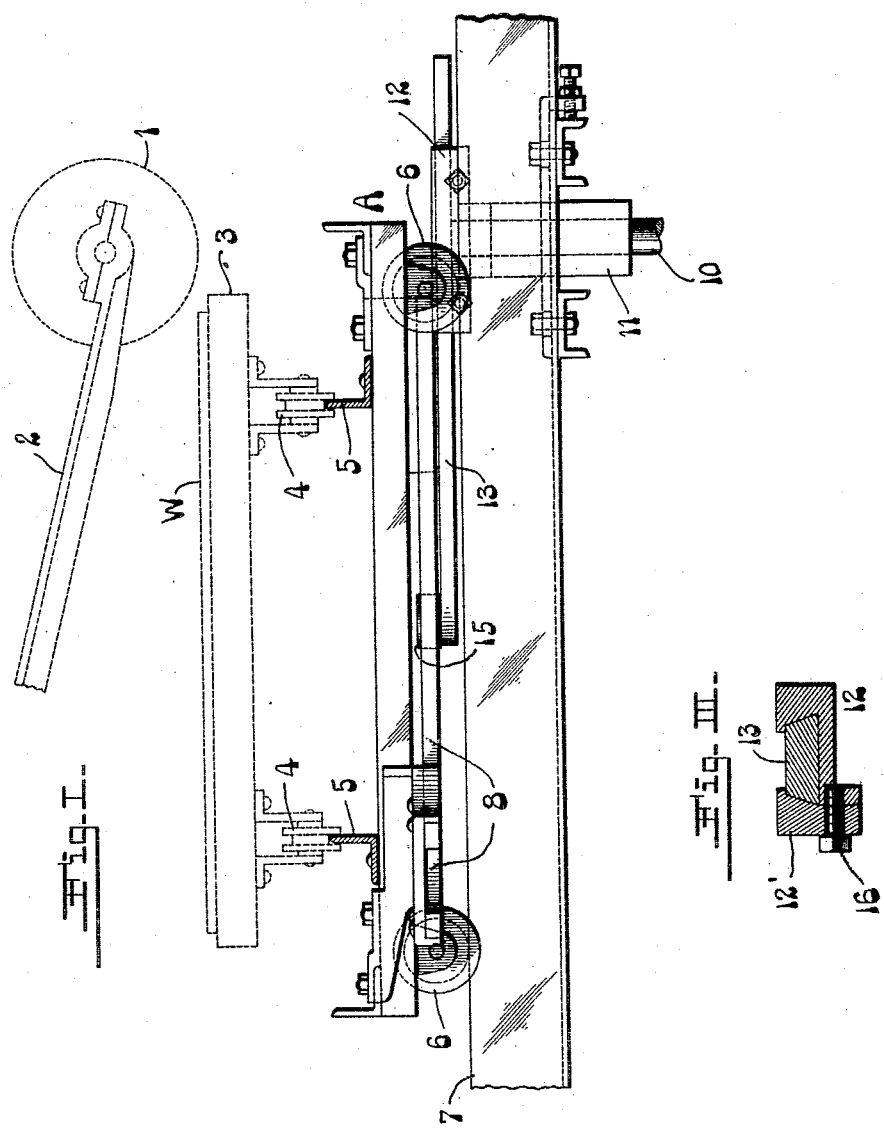

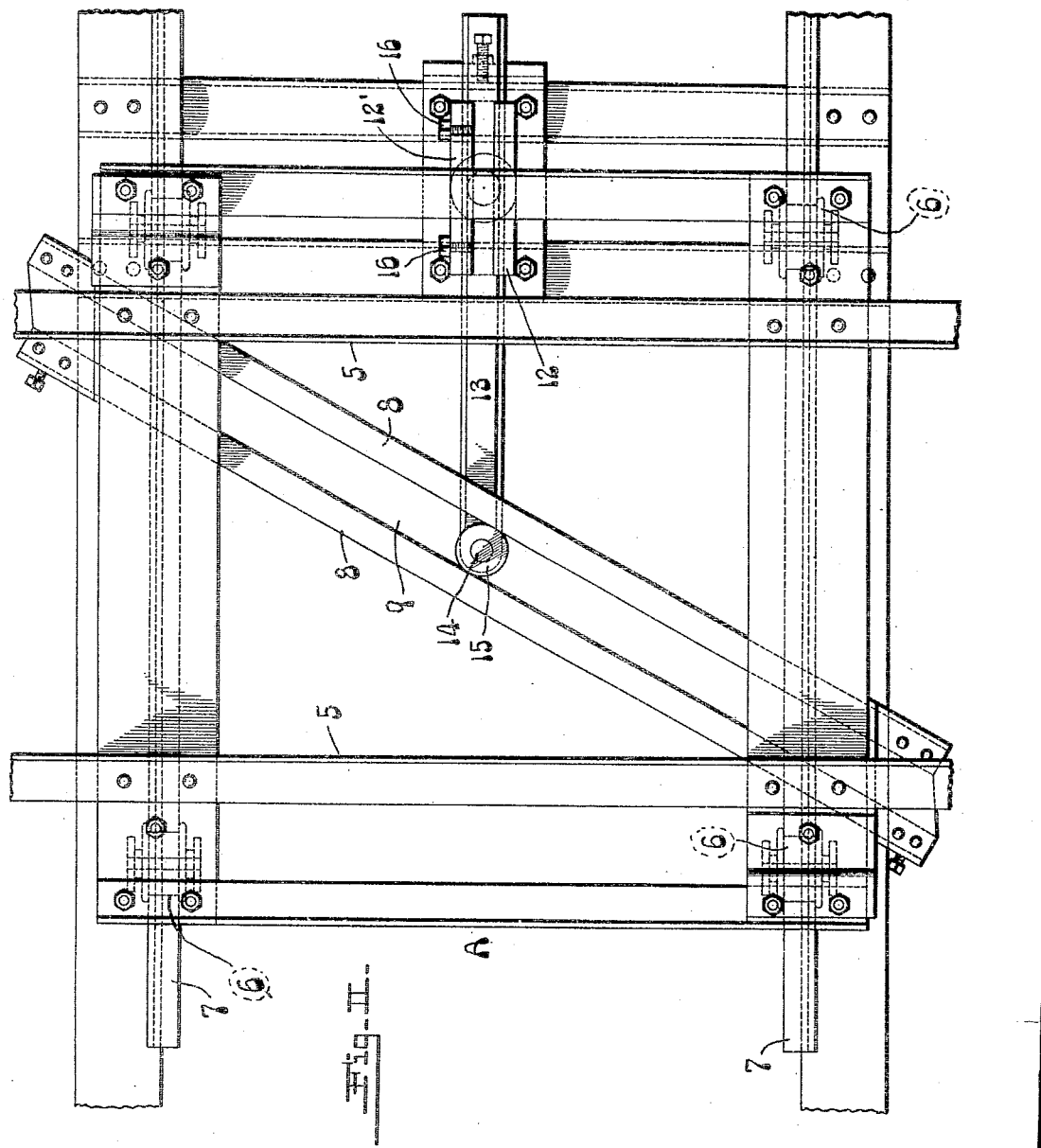

THEODORE F. PHILIPPI, OF EAST ST. LOUIS, ILLINOIS.

CRANK-DRIVEN DEVICE FOR MACHINING APPARATUS.

1,309,301. Specification of Letters Patent. Patented July 8, 1919.

Application filed July 29, 1918. Serial No. 247,321.

*To all whom it may concern:*

Be it known that I, THEODORE F. PHILIPPI, a citizen of the United States of America, a resident of East St. Louis, in the county of St. Clair, State of Illinois, have invented certain new and useful Improvements in Crank-Driven Devices for Machining Apparatus, of which the following is a full, clear, and exact description, reference being had to the accompanying drawings, forming a part of this specification.

My invention relates to improvements in crank driven devices, and more particularly to a driving device of this kind adapted to reciprocate the work feeding carriage of a machining apparatus. The present invention is an improvement on the work feeding device shown in Patent No. 1,219,038 issued to me on March 13, 1917. Briefly stated, the structure disclosed in this earlier patent is a machining apparatus provided with a reciprocating carriage whereby the work to be machined is reciprocated while it is acted upon by a rotating grinding wheel. In such a machine, the work should be fed at an approximately uniform rate of speed while it is acted upon by the grinding wheel, otherwise the surface of the work would not be uniformly finished, and to obtain the desired uniform speed I have in the earlier patent shown a reciprocating work supporting carriage driven by an endless belt or chain which travels continuously in an endless path, said belt or chain being arranged to form two strands which travel continuously in opposite directions, and the carriage being provided with means for engaging said strands alternately so as to receive a reciprocating movement.

The object of the present invention is to eliminate the traveling chain or belt of the earlier structure, also to eliminate the automatic means whereby the belt strands are engaged alternately for the purpose of driving and reversing the carriage, and to substitute for these comparatively complex devices, a simple crank which coöperates directly with the work feeding carriage. By using an ordinary crank, I simplify the driving mechanism, reducing its first cost and avoiding the trouble and expense of maintaining a complex automatic reversing device. However, the work-feeding carriage should be driven at an approximately uniform rate of speed while the grinding wheel, or the like, is in contact with the work, and the desired result cannot be obtained by transmitting movement from a crank in the ordinary manner.

If the carriage is provided with a crank-receiving slot formed at a right angle to the path of the carriage, and if the wrist pin of a rotating crank is mounted in said slot, a reciprocating movement may be imparted to the carriage, but the desired uniformity of movement will not be obtained. When a crank is used in the ordinary manner to convert a circular motion into a reciprocating motion, the speed of the reciprocating element changes constantly in response to the uniform rotary movement of the crank. My object is to use an ordinary simple crank as a driver, and to transmit movement from the crank to the carriage in such a manner that the necessary approximately uniform movement of the carriage is obtained directly from the rotating crank. I do not claim to obtain an absolutely uniform reciprocating movement, but actual practice has clearly shown that the movement transmitted in accordance with the present invention is approximately uniform during the machining operations; or that the lack of uniformity is so slight that it does not result in material imperfections on the finished surface of the work. To accomplish the desired result, the work-feeding carriage is provided with a crank-receiving slot formed at an oblique angle to the path of the carriage, and the wrist pin of an ordinary crank is mounted in the oblique slot to provide for the transmission of movement from the crank to the carriage. The most important feature of the present invention lies in the results obtained by forming the crank-receiving slot at an oblique angle, instead of at a right angle to the path of the carriage.

Figure I is a side elevation of a portion of a machining apparatus provided with a crank driven carriage constructed in accordance with the present invention.

Fig. II is a plan view of the crank driven carriage.

Fig. III is an enlarged section illustrating the means whereby the crank arm is adjustably secured to a rotary shaft.

The parts shown by dotted lines in Fig. I correspond to parts of the machine illustrated in the earlier patent to which I have referred, and these parts include a rotary grinding wheel 1 mounted in a movable arm 2, and adapted to act upon the top face of the work W secured to a carriage 3 provided with wheels 4 which rest upon tracks 5. In so far as the present invention is concerned, it is not necessary to consider the movement of the carriage 3 on the tracks 5 for the latter are rigidly secured to a reciprocating carriage A, provided with wheels 6 mounted upon straight horizontal track members 7. The carriage A is reciprocated for the purpose of reciprocating the carriage 3 and work W under the grinding wheel 1.

8 designates oppositely disposed straight crank-engaging bars arranged parallel with each other and at an oblique angle to the track members 7, so as to provide a straight oblique crank-receiving slot 9 in the carriage, said crank engaging bars being secured to the carriage below the top thereof. 10 designates a vertically arranged rotary shaft, mounted in a stationary bearing 11, and provided at its upper end with a head 12 adapted to receive a crank arm 13 having a wrist consisting of a pin 14 and a roller 15 mounted thereon. The wrist 14—15 extends upwardly from the crank arm 13 and lies in the oblique slot 9. The crank arm 13 is adjustably secured to the head 12 (Fig. III) by means of a clamping bar 12' and screws 16 which may be adjusted to clamp said crank arm 13 to the head 12. The longitudinal edges of the crank arm 13 are preferably beveled (Fig. III) to match correspondingly beveled faces on the elements 12 and 12'. Obviously, the arm 13 can be adjusted longitudinally for the purpose of varying the stroke of the reciprocating carriage A.

A careful study of the action of the driving device herein disclosed will show that the mounting of the crank wrist in the oblique slot 9 results in a number of peculiar conditions which would not be present if the slot 9 had been formed at a right angle to the path of the carriage. If the slot is formed at an oblique angle, the crank will reciprocate the carriage along the track members 7, and it will also tend to move the carriage transversely of the track members, this tendency being due to the pressure of the crank wrist 14—15 on the oblique bars 8. To positively guide the carriage in a straight line, the wheels 6 are, therefore, provided with flanges which engage the side faces of the straight track members 7. It may also be interesting to note that the path of the reciprocating carriage is longer than the diameter of the circular path of the crank wrist 14—15. This is due to the fact that the slot 9 is formed at an oblique angle to the path of the carriage, instead of being at a right angle to said path.

The most important advantage of forming the slot at an oblique angle lies in the approximately uniform movement of the reciprocating carriage. At each end of its stroke the carriage moves very slowly, and in this respect it is similar to an ordinary crank driven carriage, but when the work W (Fig. I) engages the grinding wheel 1, the carriage A is traveling in an intermediate portion of its path, and at this time it is driven at an approximately uniform rate of speed. If the angle of the slot 9 is too great or too small, the desired result will not be obtained. In actual practice I have found that by forming the slot at an obtuse angle of about 120° to the path of the carriage, the uniform rotary movement of the crank will result in the transmission of a substantially uniform reciprocating movement to the carriage while the work W is traveling under the grinding wheel 1.

It will be noted that the driving device does not reverse the carriage when the crank is parallel with the path of the carriage. The carriage continues to travel in the same direction until the crank is at a right angle to the oblique slot. This combination of elements provides for a steady uniform movement of the carriage while the grinding wheel is in contact with the surface of the work to be ground. During the grinding operation, the grinding wheel rests upon the surface of the work and exerts a pressure which is due to the weight of the wheel. It will, therefore, be readily understood that if the carriage did not travel at a uniform rate of speed, the action of the grinding wheel would not be uniform and the surface of the work would be unevenly finished.

I claim:—

1. A machine provided with a carriage having a crank-receiving slot formed at an oblique angle to the path of the carriage, and a crank for reciprocating said carriage, the wrist of said crank being mounted in the oblique slot to provide for the transmission of movement from said crank to said carriage, the oblique crank-receiving slot being long enough to permit the wrist mounted therein to travel in an endless circular path about the axis of said crank.

2. A machine provided with a carriage, a track whereby said carriage is guided in a straight line, said carriage having oppositely disposed crank-engaging members arranged parallel with each other and arranged at an oblique angle of about 120° to said track so as to provide an oblique crank-receiving slot in said carriage, and a rotary crank for reciprocating said carriage, the wrist of said crank being mounted in said oblique slot to provide for the transmission of movement from said crank to said carriage.

3. A machine provided with a work feeding carriage having flanged wheels, a pair of straight horizontal track members upon which said flanged wheels are mounted so as to positively guide the carriage in a straight line, a pair of oppositely disposed straight crank-engaging bars arranged parallel with each other and arranged at an oblique angle of about 120° to said track, so as to provide a straight oblique crank-receiving slot in said carriage, said crank-engaging bars being secured to the carriage below the top thereof, and a rotary crank for reciprocating said carriage, said crank being mounted below the carriage, the axis of the crank being vertical and its wrist being extended upwardly and arranged in said oblique slot to provide for the transmission of movement from said crank to said carriage.

In testimony that I claim the foregoing I hereunto affix my signature.

THEODORE F. PHILIPPI.

Copies of this patent may be obtained for five cents each, by addressing the "Commissioner of Patents, Washington, D. C."